Figure 1:
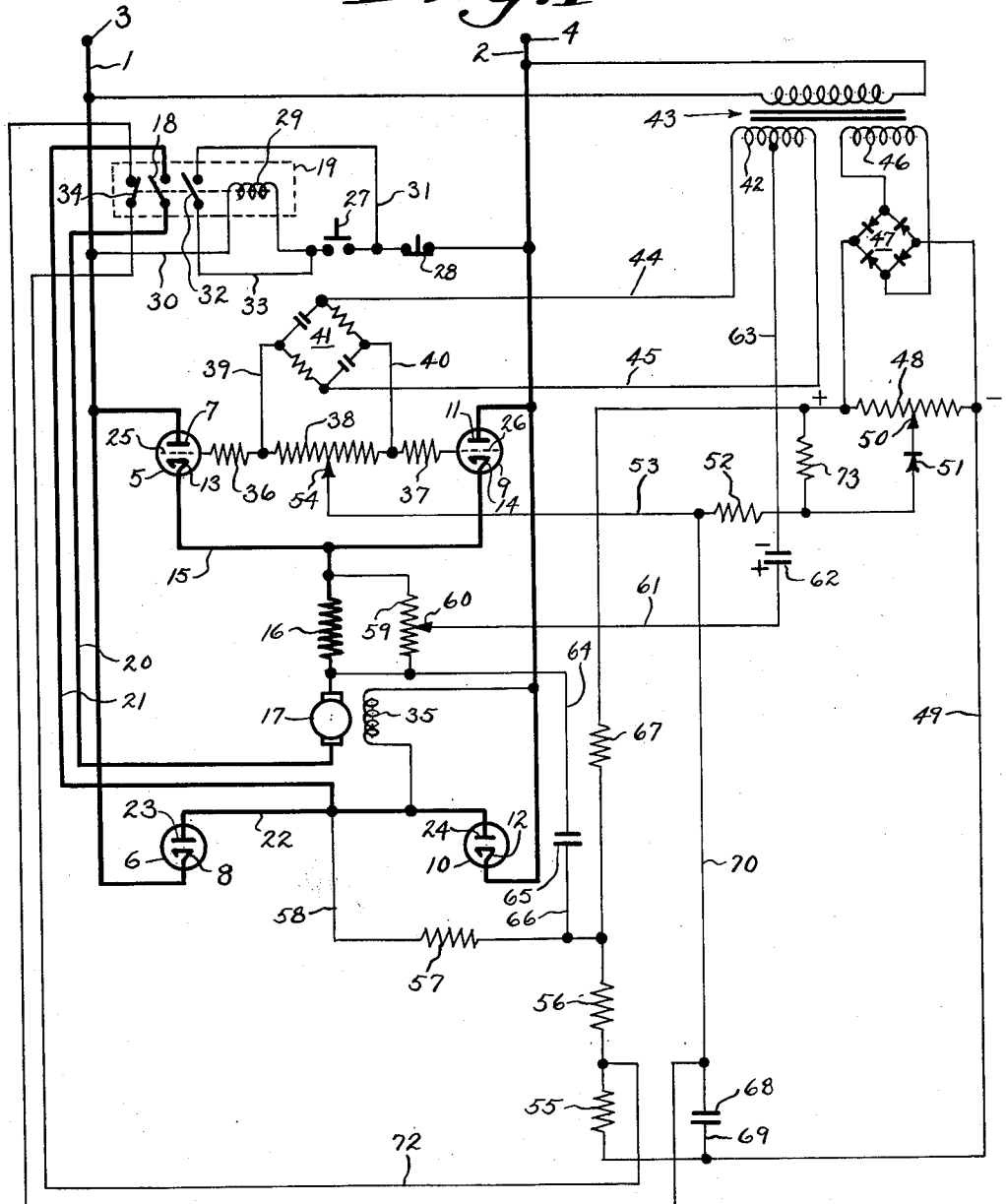

Feb. 18, 1964  Q. L. WRUCK  3,121,834
SELF-REGULATING MOTOR CONTROL
Filed June 15, 1960  2 Sheets-Sheet 1

INVENTOR
Quayne L. Wruck
BY
Arthur H. Seidel
ATTORNEY

INVENTOR
Quayne L. Wruck
BY
Arthur H. Seidel
ATTORNEY

United States Patent Office 3,121,834
Patented Feb. 18, 1964

3,121,834
SELF-REGULATING MOTOR CONTROL
Quayne L. Wruck, New Berlin, Wis., assignor to Allen-Bradley Company, Milwaukee, Wis., a corporation of Wisconsin
Filed June 15, 1960, Ser. No. 36,345
7 Claims. (Cl. 318—331)

This invention relates to a speed control for operating a D.C. motor in which the control circuit is responsive to changes in load so as to maintain selected speed.

This particular form of D.C. motor control governs the firing time of thyratron rectifier tubes feeding a motor armature through the use of a variable D.C. grid control voltage upon whihc is imposed an A.C. component known as a rider voltage. The counter electromotive force of the motor armature functions as a feedback voltage opposing the grid control voltage, and through variation of the D.C. grid control voltage the speed of the motor will vary accordingly. This change in speed follows a change in D.C. control voltage since the counter electromotive force, which is the feedback voltage, is proportional to motor speed and a feedback voltage must be developed to substantially match the selected grid control voltage.

The circuit includes a capacitor placed across the armature circuit to be charged when armature load current flows and then to provide a continued component of feedback voltage in the intervals when the rectifier does not conduct. The effect of the capacitor is to recognize changes in load and to cause an increase or decrease in motor speed as load change demands. In this manner the invention provides a speed control that maintains preselected speeds.

It is an object of this invention to provide a motor control that is self-regulating to maintain selected speed.

It is another object of this invention to provide a motor control having an adjustable D.C. control voltage for selecting motor speeds which is compensated for changes in motor load.

It is another object of this invention to provide a motor control that maintains a selected motor speed regardless of load demands on the motor shaft.

It is another object of this invention to provide a motor control that has a very rapid response to change in motor load.

It is another object of this invention to provide a motor control that is stable in its initiation of conduction through the rectifier so as to uniformly commence conduction at the same instant in each cycle.

It is another object of this invention to provide a motor control that utilizes an A.C. rider voltage in a grid circuit of a thyratron rectifier which has a large peak value to obtain improved operating characteristics.

The foregoing and other objects and advantages of this invention will appear from the description to follow. In the description reference is made to the accompanying drawings which form a part hereof and in which there is shown by way of illustration and not of limitation specific embodiments of the invention.

Figure 2:
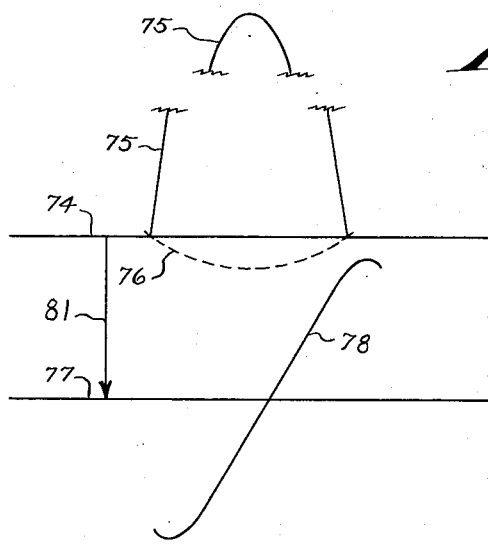
Figure 3:
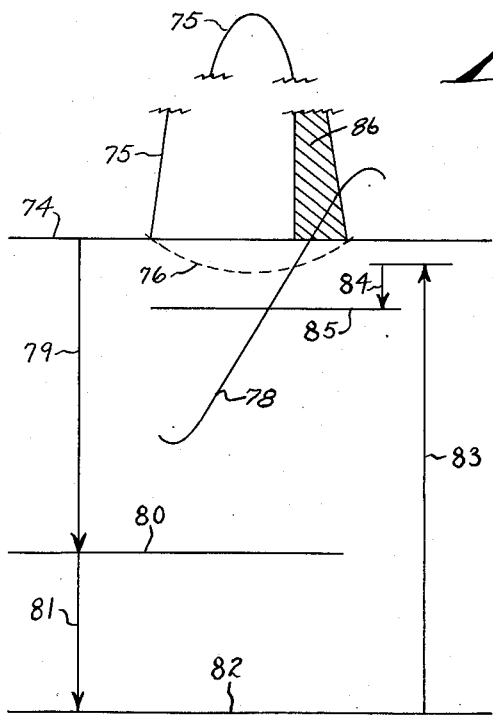

In the drawings:
FIG. 1 is a schematic wiring diagram of a control circuit embodying the invention,
FIG. 2 is a representation of certain voltages occurring in the circuit of FIG. 1 when the D.C. control voltage is at a level to preclude firing of the thyratron rectifiers, and
FIG. 3 is a representation of certain voltages occurring in the circuit of FIG. 1 for one particular speed of the motor being controlled.

Referring now to FIG. 1 of the drawings, there is shown a pair of power input leads 1 and 2 which are adapted to be connected at the terminals 3 and 4 to a single phase A.C. power source, as for example, a 440 volt, 60 cycle supply. Thyratron rectifier tube, or valve, 5 and a rectifier tube 6 are connected to the lead 1, with the plate 7 of tube 5 being tied to the lead 1 and the cathode 8 of the tube 6 being joined to an end of the lead 1. A second set of rectifier tubes 9 and 10 are connected to the lead 2, the tube 9 being a thyratron joined to the lead 2 through a connection with the tube plate 11, and the tube 10 having its cathode 12 directly connected to an end of the lead 2. The cathodes 13 and 14 of the tubes 5 and 9 are tied to one another by a lead 15, and a load compensation resistor 16 is connected at one end to the lead 15. The opposite end of the resistor 16 is joined to one side of a motor armature 17 of a D.C. motor that is to be controlled by the circuit being described. The opposite side of the motor armature 17 is connected to normally open contacts 18 of a control switch 19 through a lead 20, and a lead 21 returns from the contacts 18 to a jumper 22 that connects the plates 23 and 24 of the tubes 6 and 10 to one another.

The circuit described to this point presents a load current circuit in the form of a bridge rectifier with the armature 17 of the motor connected between opposite corners of the bridge. Hence, for the supply of load current to the armature 17 during a half cycle when the terminal 3 is positive the current flow will be from the lead 1 to the plate 7 of tube 5, through the tube 5 and lead 15 to the resistor 16 and armature 17, then through leads 20 and 21 to the jumper 22, and then through the tube 10 to the lead 2. During the alternate half cycles, when terminal 4 is positive as compared to terminal 3, the load current fed to the motor armature 17 will take a path commencing at terminal 4 and leading to the plate 11 of tube 9 from which it flows through resistor 16 to armature 17 and then through leads 20 and 21 to the jumper 22 and tube 6 from which it passes to lead 1 and terminal 3.

Control of the intervals in which current is drawn by the armature 17 is obtained through the medium of the tubes 5 and 9 which include control grid elements 25 and 26 respectively. These tubes 5 and 9 thus act as circuit gates that admit the flow of armature load current in response to grid control voltages, and the circuits for the grids 25, 26 will hereinafter be elaborated upon in detail. The circuit for starting and stopping the apparatus comprises a start button 27 and a stop button 28. The stop button 28 is connected at one side to the lead 2 and at its other side to the start button 27. Start button 27, in turn, is connected to an operating coil 29 of the switch 19, and the coil 29 completes its circuit by connection through a lead 30 to the input lead 1. The common connection between the start button 27 and stop button 28 joins through a lead 31 to a set of normally open holding contacts 32 of the switch 19. The opposite side of the holding contacts 32 are joined through a lead 33 to the connection between the start button 27 and the coil 29. The control switch 19 contains, in addition to the normally open contacts 18 and 32, a set of normally closed contacts 34 which are connected in the grid control circuit to be hereinafter described.

Upon a momentary closure of the start button 27 current is supplied to the switch coil 29 so as to operate its contacts. Contacts 32 then close to present a closed circuit shunting the start button 27, whereby, upon release of the start button 27 the coil 29 will remain energized. Closure of the power contact 18 places the motor armature 17 across the power input leads 1 and 2 through the medium of the tubes 5, 6, 9 and 10. Hence, upon a firing of the tubes to conduct current, the motor armature 17 will draw load current during the intervals determined by the grid control of the gate thyratrons 5 and 9. To stop the operation of the circuit push button 28 may be depressed to open its contacts and this, in turn, deenergizes the coil 29 of relay 19 to cause the contacts thereof to resume their normal position in which the circuit for the motor armature 17 is opened and the control coil 29 will remain deenergized.

A shunt field winding 35 of the motor is connected across the input lead 2 and the jumper 22. It will draw exciting current upon each interval of conduction of the tube 6, and during the remaining time of each cycle the stored energy of the magnetic field of the winding 35 will retain sufficient field flux since the discharge circuit of the winding 35 will be the low resistance path through tube 10. Heaters and a heater circuit for the tubes 5, 6, 9 and 10 have not been shown in the drawings, for they play no part of the invention, and circuit elements for this purpose may be incorporated as desired in accordance with well-known practice.

Between the grids 25 and 26 of the gating thyratrons 5 and 9, there is a pair of fixed resistors 36 and 37 and a potentiometer 38 connected in series with one another. A lead 39 joins at one of its ends with the connection between resistor 36 and potentiometer 38, and a second lead 40 similarly joins at one of its ends with a connection between the resistor 37 and the potentiometer 38. Leads 39 and 40 connect at their opposite ends with a phase shift network 41, which network 41 is a bridge supplied by an A.C. voltage from the secondary winding 42 of a transformer 43. The transformer is energized by connection across the leads 1 and 2, and the winding 42 is connected across the input of the phase shift circuit 41 by means of leads 44 and 45. The purpose of the phase shift network 41 is to place an A.C. component of grid control voltage upon the tube grids 25 and 26, with the instantaneous polarity of this component being of opposite sign on each of the grids 25 and 26. The phase shift is approximately a ninety degree lag with respect to the plate voltages of the gating thyratrons 5, 9, so that during a half cycle when the terminal 3 and tube plate 7 are positive the A.C. grid voltage component on the associated grid 25 is rising in value, and when the terminal 4 and tube plate 11 are positive during the succeeding half cycle the A.C. grid voltage component on the associated grid 26 is rising in value.

The transformer 43 has another secondary winding 46 which is connected to the input of a full wave rectifier 47. The output of the rectifier 47 is connected across a control potentiometer 48, and the variable output of the potentiometer 48 appears across an output lead 49 and the movable tap 50. The tap 50 is connected through a diode 51, a resistor 52 and a lead 53 to the movable tap 54 of the resistor 38. In this fashion one side of the D.C. grid control voltage signal of the adjustable potentiometer 48 is applied to the tube grids 25, 26. The tap 54 of the potentiometer is adjusted to balance the thyratrons 5, 9 and the A.C. signal of the network 41 rides upon the selected D.C. signal of the potentiometer 48 in a manner to be described more fully.

To complete the circuit for applying the D.C. grid control signal of the potentiometer 48 the lead 49 is connected through a set of resistors 55, 56 and 57 and a lead 58 to the jumper lead 22. Hence, the D.C. signal voltage output of the potentiometer 48 is connected at one end to the far side of the motor armature 17 opposite the side of the armature connected to the gating thyratrons 5 and 9. In this manner of connection the counter electromotive force, or armature reaction voltage, of the motor is in opposition to the applied D.C. signal voltage and functions as a feedback voltage to be utilized as hereinafter explained.

Referring now to the resistor 16 connected in series with the motor armature 17, a potentiometer 59 with an adjustable tap 60 is connected across the resistor 16 and the tap 60 is joined through a lead 61 to one side of a control capacitor 62. The opposite side of the control capacitor 62 is connected through a lead 63 to the center of the transformer secondary winding 42, and this center connection effectively places the side of the capacitor 62 connected to the lead 63 at the tap 54 of the potentiometer 38. The lower side of the potentiometer 59 is connected through a lead 64 to a capacitor 65 and then through a lead 66 to one side of the resistor 57. The resistor 57 and capacitor 65 function to give a slight phase shift to the feedback signal voltages of the circuit which are to be described so as to enhance the operation of the apparatus.

The resistors 55 and 56 are connected to one another and to a resistor 67 in series across the two end connections of the potentiometer 48 to provide a voltage divider network, and an inrush control capacitor 68 is connected between the lead 49 and the lead 53 by means of leads 69 and 70. A lead 71 branches from the lead 70 and extends to one side of the normally closed contacts 34 of the control switch 19. The opposite side of the normally closed contact 34 is joined through a lead 72 to the common connection of resistors 55 and 56. Hence, when the contacts 34 are closed the capacitor 68 is shorted across the resistor 55. The circuit of FIG. 1 is completed by placing a large value resistor 73 across one end of the potentiometer 48 and the connection between the resistor 52 and diode 51. The resistor 73 and resistor 52 are consequently in series with the inrush control capacitor 68 to provide a charging circuit for the capacitor 68 which is across the full output voltage of the rectifier 47.

The operation of the circuit will first be described with the control potentiometer set to maintain the gating thyratrons 5, 9 cut-off for the entire cycle. This is the zero speed condition and reference is made to FIG. 2 for a graphical representation of typical voltages applied to the grids 25, 26 to achieve this condition of zero output.

The voltage potential level at the cathodes 13, 14 is represented in FIG. 2 by the reference line 74, and with time being the horizontal axis the condition is shown for a half cycle in which the plate 7 of tube 5 is positive. The positive half cycle of plate voltage is represented by the wave 75 which is broken to accommodate the scale of the drawing. The scale employed is not rigorous, but for a 440 volt supply the amplitude of the wave 75 is very great compared to that of the other voltages shown.

The critical grid voltage of the tube 5 is represented by the dotted curve 76, and if the grid voltage rises above this critical value at any time during the half cycle the tube 5 will conduct and continue to conduct during the remainder of the half cycle. For the zero speed condition the grid voltage is maintained below the curve 76 for the entire half cycle under discussion.

Commencing at the cathode 13 and lead 15 and tracing through the circuit which influences grid voltage one first passes through resistor 16 and armature 17. Since there is no armature current, or voltage, in the condition of FIG. 2 there are no voltage drops appearing for these items 16, 17 in FIG. 2. Hence, the voltage level at the jumper lead 22 is the same as for the cathode 13 and coincides with the reference line 74. Continuing through the circuit a voltage drop is encountered at the resistors 55, 56 since these resistors in combination with the resistor 67 form a voltage divider across the rectifier 47. This voltage drop of the resistors 55, 56 is represented in FIG. 2 by the downwardly pointing arrow 81, and the horizontal line 77 at the lower end of the arrow 81 is the comparative voltage level at the lead 49.

Continuing to trace through the pertinent portion of the circuit, the next element is the potentiometer 48, which is adjusted for zero voltage, i.e., the tap 50 is to the far right in FIG. 1. Hence, there is no D.C. variable signal in FIG. 2, and there is no direct current flowing through the resistor 52 or in the potentiometer 38, wherefore the D.C. voltage level at the grids 25, 26 is the same as at the lead 49, and hence is also represented in FIG. 2 by the line 77. The remaining voltage shown in FIG. 2 is the A.C. rider voltage signal of circuit 41 which appears across potentiometer 38 and alternates about the D.C. grid voltage level. This A.C. voltage is shown in FIG. 2 by curve 78 and its axis is the line 77.

The voltage represented by the curve 78 is increasing toward its maximum positive value during the half cycle under discussion, but is maintained below the critical grid voltage 76, so that the tube 5 will not conduct.

When it is desired to drive a load and admit current to the armature 17 the control potentiometer 48 is adjusted to place a positive D.C. signal voltage component upon the grids 25, 26. The greater the signal voltage the greater the motor speed, and in FIG. 3 there is shown a graphical representation of circuit voltage values for a particular selected setting of the potentiometer 48.

Referring specifically to FIG. 3, a half cycle in which the plate 7 is positive is shown, and voltage curves 75 and 76 are repeated from FIG. 2. The cathode voltage level represented by line 74 is also repeated in FIG. 3. Tracing through the circuit, as was similarly done in connection with FIG. 2, a voltage appears across the resistor 16 due to load current, and another voltage appears across the armature 17 which is the counter electromotive force voltage. This armature voltage is referred to herein as an armature feedback voltage opposing the voltage of the potentiometer 48, in reference to the tube grids, and while the motor only conducts a load current for a fraction of a cycle this feedback voltage is nevertheless maintained at a substantial value throughout the entire cycle. This maintenance is due to the generator action of armature 17 that occurs as the armature rotates in the field of the shunt winding 35, and in FIG. 3 the feedback voltage and the voltage drop of resistor 16 are represented by the downwardly pointing arrow 79. The horizontal line 80 at the lower end of the arrow 79 represents the voltage level at the jumper lead 22 with respect to the cathodes 13, 14. The voltage drop of the resistors 56, 55 is shown in FIG. 3 by the arrow 81, which is repeated from FIG. 2, and the line 82 is the voltage level of the lead 49, or negative end of the potentiometer 48. The selected signal voltage of the control potentiometer 48 appearing across lead 49 and tap 50 is represented by the upwardly extending arrow 83, and the remaining D.C. component shown in FIG. 3 is the downwardly directed arrow 84. This is a voltage drop appearing across resistors in the grid circuit caused by a discharge of the control capacitor 62. The nature of this voltage drop represented by the arrow 84 will be discussed herein. At this point it is desired to point out that the lower end of the vector arrow 84 represents the D.C. signal voltage level at the grids 25, 26. This level of signal voltage is indicated by the line 85, and the A.C. rider voltage is imposed upon this D.C. level.

The line 85 in FIG. 3 is at a higher level than the line 77 of FIG. 2, and hence the A.C. rider voltage wave 78 (which is represented in FIG. 3 with the same reference numeral as in FIG. 2) is also elevated to intersect and rise above the critical grid voltage 76. At the point of time when the grid voltage intersects the critical voltage curve 76 the tube 5 conducts and then continues to conduct during the remainder of the half cycle, as shown by the shaded area 86.

The greater the selected D.C. grid voltage signal of the potentiometer 48 the earlier the tubes 5, 9 conduct and hence the effective applied voltage to the motor is increased. The motor speed will then rise to develop a proportional increase in the counter voltage of the armature. Hence, by selection of the setting of the potentiometer tap 50 the speed of the motor is controlled.

Referring now to the function of the control capacitor 62, it is charged to an amount inversely proportional to the load current of the motor that flows through the load compensation resistor 16. The particular charging circuit in the apparatus of FIG. 1 for the capacitor 62 is quite complex. The capacitor 62 is subject to a circuit comprising the lead 61, the lower portion of the potentiometer 59, the armature 17, the lead 58, the resistors 57—55, the lead 49, the potentiometer 48, the diode 51, the resistor 52, the lead 53, the circuit 41, leads 44 and 45, transformer secondary 42 and lead 63. This circuit includes the armature feedback voltage, the control potential of potentiometer 48 and, when the tubes conduct, the voltage drop across the lower portion of potentiometer 59.

The full charge of the capacitor 62 is developed when one of the thyratron tubes fires to conduct load current, and the manner of developing this charge may be explained as follows. At the time of firing the instantaneous line voltage is applied across the resistor 16 and the motor armature 17 (assuming negligible voltage drops across the tubes). The load current that will flow develops a voltage across the resistor 16, and the remainder of the line voltage will be across the motor armature 17. The armature has an internal drop due to resistance and inductance, and also presents the feedback voltage.

A portion of the voltage drop across resistor 16 appears between the top of the potentiometer 59 and the potentiometer tap 60, and from the tap 60 a circuit extends through lead 61 to one side of capacitor 62, then from capacitor 62 through lead 63, transformer secondary 42, leads 44, 45, phase shift circuit 41, the resistance of potentiometer 38, lead 53, resistance 52, diode 51, the part of control potentiometer 48 which presents a bias voltage for the rectifier tubes, lead 49, resistances 55—57, and lead 58 to the jumper lead 22. The net charging voltage impressed across this circuit between tap 60 and lead 22 is the instantaneous line voltage minus the drop across the upper part of the potentiometer 59. The capacitor 62 is subject to this charging voltage minus the grid control voltages in the circuit during the intervals when the tubes conduct load current. For a larger load current the voltage drop across the upper part of potentiometer 59 will be greater, and the net charging voltage and resultant charge for the capacitor 62 will decrease, wherefore the capacitor charge is inversely proportional to load.

The level of the line 85 in FIG. 3 is dependent upon the charge of the capacitor 62 and its rate of discharge. After it receives a charge during a time interval when the motor draws load current and one of the tubes 5, 9 conducts it will commence to discharge. The discharge circuit for the capacitor 62, commencing with the lead 61 at the positive side of the capacitor, includes the potentiometer 59, armature 17, leads 20 and 21, lead 58, the resistors 55—57, the entire potentiometer 48, the resistors 73 and 52, the potentiometer 38, and the circuit 41. The voltage drops across the cumulative resistance of the individual resistor components in this discharge circuit places a negative voltage component on the tube grids during the time interval when the tubes 25, 26 are not conducting, which component is in opposition to the positive control voltage placed on the thyratron grids by the potentiometer 48. This voltage component is the downwardly directed arrow 84 of FIG. 3, and its value is seen to determine the level of line 85, and hence the point of time at which the A.C. rider voltage causes the tube 5 to conduct.

If the level of the line 85 is raised by having a smaller charge on the capacitor 62 the D.C. component of signal voltage on the grid 25 will be less negative and the A.C. rider voltage will accordingly be transposed upwardly. The A.C. rider voltage wave 78 then intersects the critical grid voltage 76 earlier in the time cycle. This causes the associated tube 5 to fire earlier and an increase in rotor speed results over that of a situation in which the capacitor 62 has a greater charge. The discharge of the capacitor 62 through the resistor 52 thus affects motor speed.

The invention utilizes the capacitor 62 and its effect upon motor speed to automatically adjust for fluctuations in load. This is done by the provision of the load compensation resistor 16 and the potentiometer 59. With the motor running and upon occurrence of an increase in load the counter electromotive force of the armature is decreased and the voltage drop across the resistor 16 for an interval of load current conduction is increased. The charge of the capacitor 62 for this interval, when the load current is larger than in previous load current intervals, is then slightly decreased from that of such previous intervals. The voltage drop 84 that then occurs during discharge of capacitor 62 will be less than for previous cycles, and consequently the level of line 85 will rise. The A.C. rider voltage will now cause the tube to fire earlier and as a result the counter electromotive force of the armature is retained at its original level and compensation is made for the increase in circuit losses occasioned by the increase in load current. With the maintenance of the counter electromotive force motor speed is held constant, and the invention therefore provides a self-regulating maintenance of selected speed that corrects for fluctuations in load.

The inrush control capacitor 68 functions to protect the motor armature 17 from dangerously large current surges whenever the tap 50 of the speed control potentiometer 48 is rapidly shifted to put out a substantially larger D.C. signal voltage. A sudden increase in the D.C. signal voltage will call for an earlier firing of the tubes 5, 9 with an abrupt rise in the voltage applied to the armature 17. The counter electromotive force of the armature 17 will be insufficient to limit the resulting inrush of armature current and overload conditions might result if no protection is afforded by the circuit.

The presence of the capacitor 68 limits application of a sudden D.C. signal to the tube grids 25, 26 by drawing a charging current through the resistors 52 and 73 when the voltage at the potentiometer tap 50 is raised. The charging rate of the capacitor is such as to match accelerating characteristics of the motor, whereby the signal voltage level at the tube grids 25, 26 rises in response to movement of the tap 50 at a rate to quickly accelerate the motor without allowing the motor to draw excessive current.

The normally closed switch contacts 34 and associated leads 71, 72 present a discharge path for the capacitor 68 through the resistor 55. Hence, before starting the motor the capacitor 68 will be at the low voltage level of the resistor 55 so that it will be ready to perform its function of limiting inrush current upon initiation of motor operation.

In practicing the invention an A.C. rider voltage may be selected that is of substantial amplitude. The portion of the curve 78 which is employed for passing above the critical grid voltage is then the nearly straight line portion of the curve which has a steep slope. Since this straight line portion extends well toward the peak of the voltage wave stable operation is achieved at values of low speed. To further stabilize operation the A.C. rider voltage is preferably phase shifted by the circuit 41 in an amount slightly greater than ninety degrees, whereby the peak portion of the voltage wave 78 is not used for passing above the critical grid voltage value for initiating tube conduction.

The invention provides an efficient circuit for controlling a D.C. motor in which the armature voltage is utilized as a feedback signal for a grid control circuit having a D.C. signal component and an A.C. rider signal imposed thereon. The circuit for this form of control includes a load compensating resistance in series with the motor which provides a voltage indicative of load current, and a capacitor is connected into the circuit that is across this resistance and a portion of the grid circuit to receive a charge proportional to this voltage. A discharge circuit for the capacitor employs resistance in the grid circuit whereby discharge current causes a signal voltage component to be applied to the tube grids that is proportional to the load current. In this manner motor speed is regulated through sensing load conditions of the motor.

I claim:
1. In a motor control circuit having:
  a first pair of rectifiers each with a control element;
  a second pair of rectifiers;
  connections joining said first pair of rectifiers with said second pair of rectifiers in a bridge and including a set of terminals between the first and second pair of rectifiers for connection to a motor to be controlled; and
  a direct current control voltage source connected to the control elements of said first pair of rectifiers;
the combination therewith of:
  a load current impedance interposed in said connections between the first and second pair of rectifiers which is in series with the terminals for connection to the motor, which impedance develops a voltage upon flow of load current that is in series with the motor voltage;
  a control capacitor having a charging circuit connected across said terminals for connection to the motor, said control capacitor being charged upon flow of load current by the voltage between the pairs of rectifiers less the voltage across said load current impedance;
  a discharge impedance connected to the control elements of said first pair of rectifiers; and
  a capacitor discharge circuit connecting said capacitor to said discharge impedance, said capacitor discharging through the impedance and developing a control voltage in the impedance that is applied to said rectifier control elements in opposition to said direct current control voltage source.

2. A motor control circuit in accordance with claim 1 in which said load current impedance comprises a resistance with a tap between the ends thereof that is connected to said control capacitor.

3. A motor control circuit in accordance with claim 1 having a rectifier control element circuit for said first pair of rectifiers which joins the motor, the direct current control voltage source and the discharge impedance in series, whereby the motor voltage is a feed back in opposition to said direct current control voltage source.

4. A motor control circuit in accordance with claim 3 in which said rectifier control element circuit has a bias resistance that develops a negative voltage upon said rectifier control elements establishing a cut-off condition, and there is provided an alternating current control voltage source connected to said rectifier control elements imparting a control voltage for each control element that increases with time during a positive voltage being applied to the associated rectifier.

5. In a motor control circuit having:
  power input lines;
  a rectifier with a control element;
  motor connections for joining with a motor to be controlled;
  a load circuit joining said rectifier and said motor connections in series between said power input lines;
  a direct current control voltage source joined to the control element of said rectifier;
  an alternating current control voltage source joined to the control element of said rectifier;
the combination therewith of:
  a load current impedance interposed in said load circuit at one side of and in series with said motor connections, which impedance develops a voltage upon flow of load current;
  a control capacitor having one side thereof connected to said motor connections at one side of the motor and having the other side thereof connected to the opposite side of the motor at a point between the motor and a substantial portion of said load current impedance, said control capacitor being charged upon flow of load current through said rectifier by a voltage proportional to line voltage minus the voltage of the load current impedance;

a discharge impedance connected to the control element of said rectifier;

a capacitor discharge circuit connecting said capacitor through said discharge impedance, said capacitor developing a voltage across said impedance upon discharge thereof that is applied to said rectifier control element, thereby modifying the voltage of the control element.

6. A motor control circuit in accordance with claim 5 in which said load current impedance comprises a resistance with a tap between the ends thereof that is connected to said control capacitor.

7. A motor control circuit in accordance with claim 5 having a rectifier control element circuit which joins said motor, said direct current control voltage source, said alternating current control voltage source, and said discharge impedance in series, and with the motor voltage and the discharge impedance voltages in opposition to said direct current control voltage source.

References Cited in the file of this patent

UNITED STATES PATENTS

| | | |
|---|---|---|
| 2,753,506 | Elliot | July 3, 1956 |
| 2,778,983 | Elliot | Jan. 22, 1957 |
| 2,913,653 | Bichrel et al. | Nov. 17, 1959 |